(12) United States Patent
Serra Lleti et al.

(10) Patent No.: US 11,543,644 B2
(45) Date of Patent: Jan. 3, 2023

(54) DIGITAL IMAGING DEVICE AND METHOD FOR GENERATING A DIGITAL COLOR IMAGE

(71) Applicant: Leica Microsystems CMS GmbH, Wetzlar (DE)

(72) Inventors: Jose Miguel Serra Lleti, Wetzlar (DE); Kai Ritschel, Heuchelheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/223,052

(22) Filed: Apr. 6, 2021

(65) Prior Publication Data

US 2021/0325657 A1 Oct. 21, 2021

(30) Foreign Application Priority Data

Apr. 17, 2020 (EP) .................................... 20170073

(51) Int. Cl.
*H04N 7/18* (2006.01)
*G02B 21/36* (2006.01)
*G06T 7/90* (2017.01)
*G02B 5/20* (2006.01)

(52) U.S. Cl.
CPC ......... *G02B 21/361* (2013.01); *G02B 21/368* (2013.01); *G06T 7/90* (2017.01); *G02B 5/20* (2013.01); *G06T 2207/10056* (2013.01)

(58) Field of Classification Search
CPC ...... G02B 21/361; G02B 21/368; G02B 5/20; G06T 7/90; G06T 2207/10056

USPC .......................................................... 348/79
See application file for complete search history.

(56) References Cited

U.S. PATENT DOCUMENTS

| | | | |
|---|---|---|---|
| 2009/0102943 A1 | 4/2009 | Hattori | |
| 2012/0314108 A1 | 12/2012 | Ogasahara | |
| 2016/0266255 A1* | 9/2016 | Nishikawa | H04N 5/2256 |
| 2016/0350914 A1* | 12/2016 | Champlin | G06V 10/56 |
| 2019/0302436 A1* | 10/2019 | Hsu | G06T 5/50 |
| 2021/0331704 A1* | 10/2021 | Zhu | G06T 7/70 |

FOREIGN PATENT DOCUMENTS

| | | |
|---|---|---|
| EP | 1 578 139 A1 | 9/2005 |
| EP | 1 729 524 A1 | 12/2006 |

* cited by examiner

*Primary Examiner* — Jayanti K Patel
*Assistant Examiner* — Richard B Carter
(74) *Attorney, Agent, or Firm* — Leydig, Voit & Mayer, Ltd.

(57) ABSTRACT

A microscope includes a digital imaging device. The digital imaging device comprises a processor which is configured to: obtain a number of digital grayscale images of an object at a number of different spectral sensitivities, each of the digital grayscale images including grayscale information based on a different one of the different spectral sensitivities, obtain a number of weighting factors for each of the digital grayscale images, the weighting factors being allocated to a number of color channels defining a predetermined color space, and synthesize a digital color image of the object from the digital grayscale images in the color space by distributing the grayscale information of each grayscale image over the color channels in accordance with the weighting factors.

14 Claims, 3 Drawing Sheets

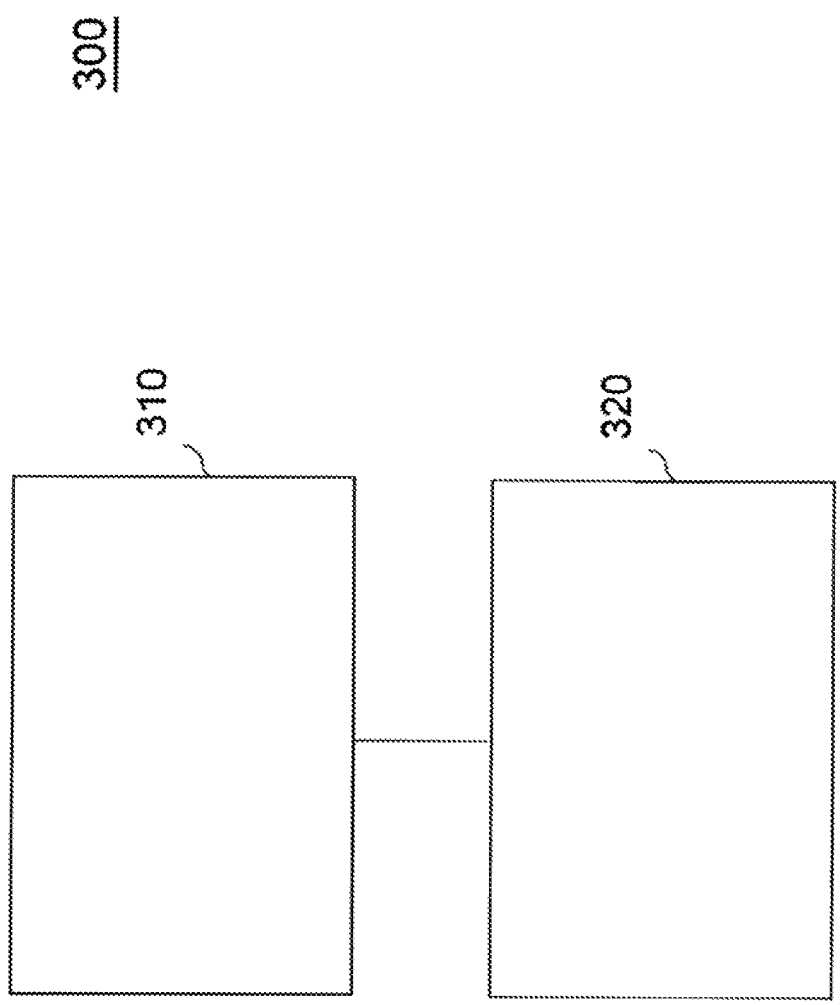

DIGITAL IMAGING DEVICE AND METHOD FOR GENERATING A DIGITAL COLOR IMAGE

CROSS-REFERENCE TO PRIOR APPLICATION

Priority is claimed to European Patent Application No. EP 20170073.9, filed on Apr. 17, 2020, the entire disclosure of which is hereby incorporated by reference herein.

FIELD

The present invention relates to a digital imaging device, a microscope comprising a digital imaging device, and a method for generating a digital color image of an object.

BACKGROUND

In the field of microscopy, a color camera may be used to acquire images. Typically, such a color camera comprises an array of color filters arranged on a grid of photosensors. Specifically, a so-called Bayer filter mosaic may be used as filter array for color imaging. The Bayer filter mosaic comprises green (G), red (R) and blue (B) color filters in predetermined proportions, typically 50% G, 25% R and 25% B.

Using a color camera in microscopy allows to detect the real color of an object which has beneficial for evaluating samples e.g. in pathology and histology and to determine the staining of a sample prior to closer inspection. However, incorporating a color camera in a wide field or confocal microscope is often very costly. Therefore, monochrome imaging is still the preferred method in microscopy. Though it may be envisaged to provide both monochrome and color cameras in a microscope, it is difficult to achieve a precise time and spatial fit of the image data created in the different imaging modalities.

The article "Color image acquisition using monochrome camera and standard fluorescence filter cubes", G. F. Weber, A. S. Menko, Biotechniques, Vol. 38, No. 1, discloses a method in which monochrome images are combined by means of graphics software. However, this method is not suitable to automatically create color images based on monochrome imaging.

SUMMARY

In an embodiment, the present invention provides a microscope. The microscope includes a digital imaging device. The digital imaging device comprises a processor which is configured to: obtain a number of digital grayscale images of an object at a number of different spectral sensitivities, each of the digital grayscale images including grayscale information based on a different one of the different spectral sensitivities, obtain a number of weighting factors for each of the digital grayscale images, the weighting factors being allocated to a number of color channels defining a predetermined color space, and synthesize a digital color image of the object from the digital grayscale images in the color space by distributing the grayscale information of each grayscale image over the color channels in accordance with the weighting factors.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 3 shows a schematic illustration of a system configured to perform a method described therein.

DETAILED DESCRIPTION

Figure 1:
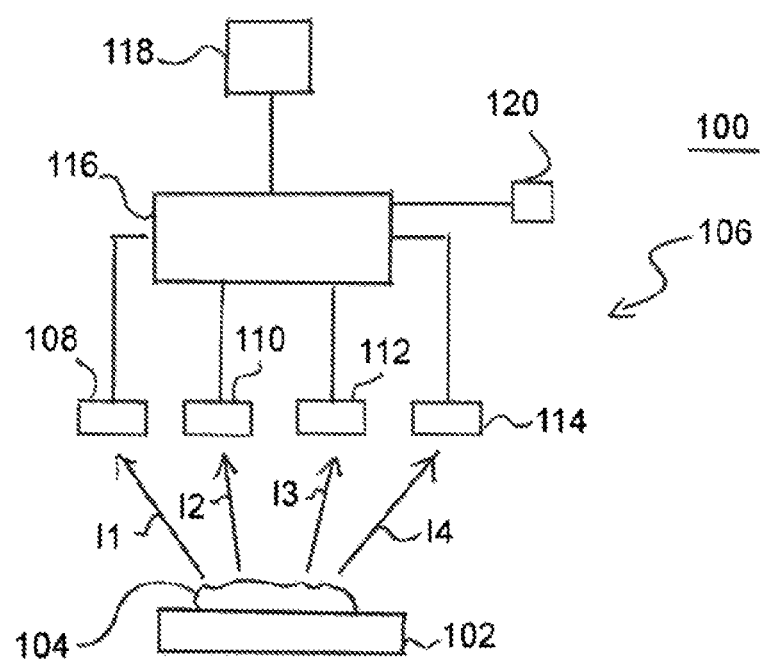
FIG. 1 is a block diagram showing an embodiment of the digital imaging device.

Embodiments of the present invention provide a digital imaging device and a method which allow to generate a digital color image of an object based on digital grayscale images in a reliable manner.

According to an embodiment of the present invention, a microscope comprises a digital imaging device, the digital imaging device comprising a processor which is configured to obtain a number of digital grayscale images of an object at a number of different spectral sensitivities wherein each digital grayscale image includes grayscale information based on a different one of the different spectral sensitivities. The processor is configured to obtain a number of weighting factors for each digital grayscale image, said weighting factors being allocated to a number of color channels defining a predetermined color space. The processor is further configured to synthesize a digital color image of the object from the digital grayscale images in said color space by distributing the grayscale information of each grayscale image over the color channels in accordance with the weighting factors.

The microscope may be used as a virtual color camera by transforming a number of spectral input channels represented by the different spectral sensitivities of the digital grayscale images into a number of spectral output channels which are given by color channels defining a color space of a color camera which is to be simulated by the digital imaging device. Thus, each grayscale image belonging to one of the input channels represented by the different spectral sensitivities is weighted against a model of a color camera which is to be simulated by the digital imaging device.

The color space, into which the digital grayscale images are transformed, may be one of the typical color spaces used in the field like RGB (red, green, blue), CMYK (cyan, magenta, yellow, black), etc.

Preferably, the number of spectral sensitivities of the grayscale images is different from and in particular greater than the number of color channels of the color space. The greater the number of input channels represented by the different spectral sensitivities of the grayscale images, the higher the image information which can be used to create the digital color image. Accordingly, the quality of the digital color image increases with the number of spectral sensitivities of the grayscale images. Color imaging as disclosed herein can be achieved irrespective of whether or not the input spectra represented by the spectral sensitivities of the grayscale images overlap. Further, input spectra outside the visible range such as infrared (IR) light can be processed.

The weighting factors may be represented by a matrix, a number of rows thereof being equal to the number of spectral input channels, i.e. the number of digital grayscale images, and a number of columns thereof being equal to the number of output channels, i.e. the number of color channels of the camera model to be simulated. Accordingly, the determination of the digital color image based on the different digital grayscale images comes down to a simple matrix multiplication facilitating real-time color imaging.

The weighting factors based on which the grayscale information of each digital grayscale image is distributed over the different color channels of the camera model may be determined in advance prior to the acquisition of the digital grayscale images. Thus, the calculation effort required for synthesizing the digital color image is low, and real-time color imaging can be is easily achieved.

Preferably, the grayscale information of each digital grayscale image is corrected for a sensor quantum yield. The sensor quantum yield is a device parameter known in advance. Thus, the sensor quantum yield can already be considered when determining the weighting factors. Accordingly, the correction for the sensor quantum yield does not affect real-time color imaging.

The weighting factors may be corrected in accordance with a Bayer filter. For instance, in case that an RGB camera model is applied, a Bayer filter correction gives more weight to the G component with a value of 0.5 than to the R and B components with a value of 0.25, respectively.

The processor may be configured to determine a maximum from all image values of the digital color image and to normalize the image values based on said maximum. For instance, in case that the digital color image shall be processed in form of a 8 bit image including values from 0 to 256, a scale factor 256/Max is calculated wherein Max designates the afore-mentioned maximum, and all image values of the digital color image are normalized with this scale factor.

The processor may further be configured to perform a white balance on the digital color image. Thus, quality of the digital color image can be improved.

According to a preferred embodiment, the microscope comprises a number of image sensors configured to acquire said number of digital grayscale images at said number of different spectral sensitivities. Thus, the grayscale images may be acquired sequentially or simultaneously by means of multiple image sensors with different sensitivities in the spectral domain. However, the digital imaging device is not limited thereto. For instance, the digital imaging device may also be used for post-processing of grayscale images which have been created by means of a single image sensor and multiple color filters which are sequentially introduced into an optical path leading to the image sensor for creating a sequence of grayscale images in different spectra. As the spectral characteristics of the color filters are known in advance, corresponding weighting factors can be determined, and a post-processing process may be performed on the sequence of grayscale images for synthesizing a digital color image.

Each of the image sensors may be formed by a wide-field sensor without being limited thereto. For instance, the digital imaging device may also be used in a confocal microscope using a point sensor for sequentially acquiring the digital grayscale images pixel by pixel.

Preferably, the microscope comprises a display device which is configured to display the digital color image in real time.

Preferably, the microscope may be a confocal microscope or a wide field microscope as already mentioned above without being limited thereto.

According to another embodiment, a method for generating a digital color image of an object is provided, wherein the method comprises the following steps: using a microscope, obtaining a number of digital grayscale images of the object at a number of different spectral sensitivities, each digital grayscale image including grayscale information based on a different one of said different spectral sensitivities; obtaining a number of weighting factors for each digital grayscale image, said weighting factors being allocated to a number of color channels defining a predetermined color space; and synthesizing a digital color image of the object from the digital grayscale images in said color space by distributing the grayscale information of each grayscale image over the color channels in accordance with the weighting factors.

For instance, the weighting factors may be obtained by reading the same from a memory. Accordingly, the weighting factors are not required to be determined during the imaging process. Rather, as both the spectral sensitivities of the digital grayscale images as well as the color channels of the utilized camera model are known in advance, the weighting factors can be determined prior to the imaging process and stored in the memory. The memory may then be accessed to retrieve the weighting factors at the time of image acquisition.

According to another embodiment, a computer program with a program code for performing the method is provided.

Figure 2:
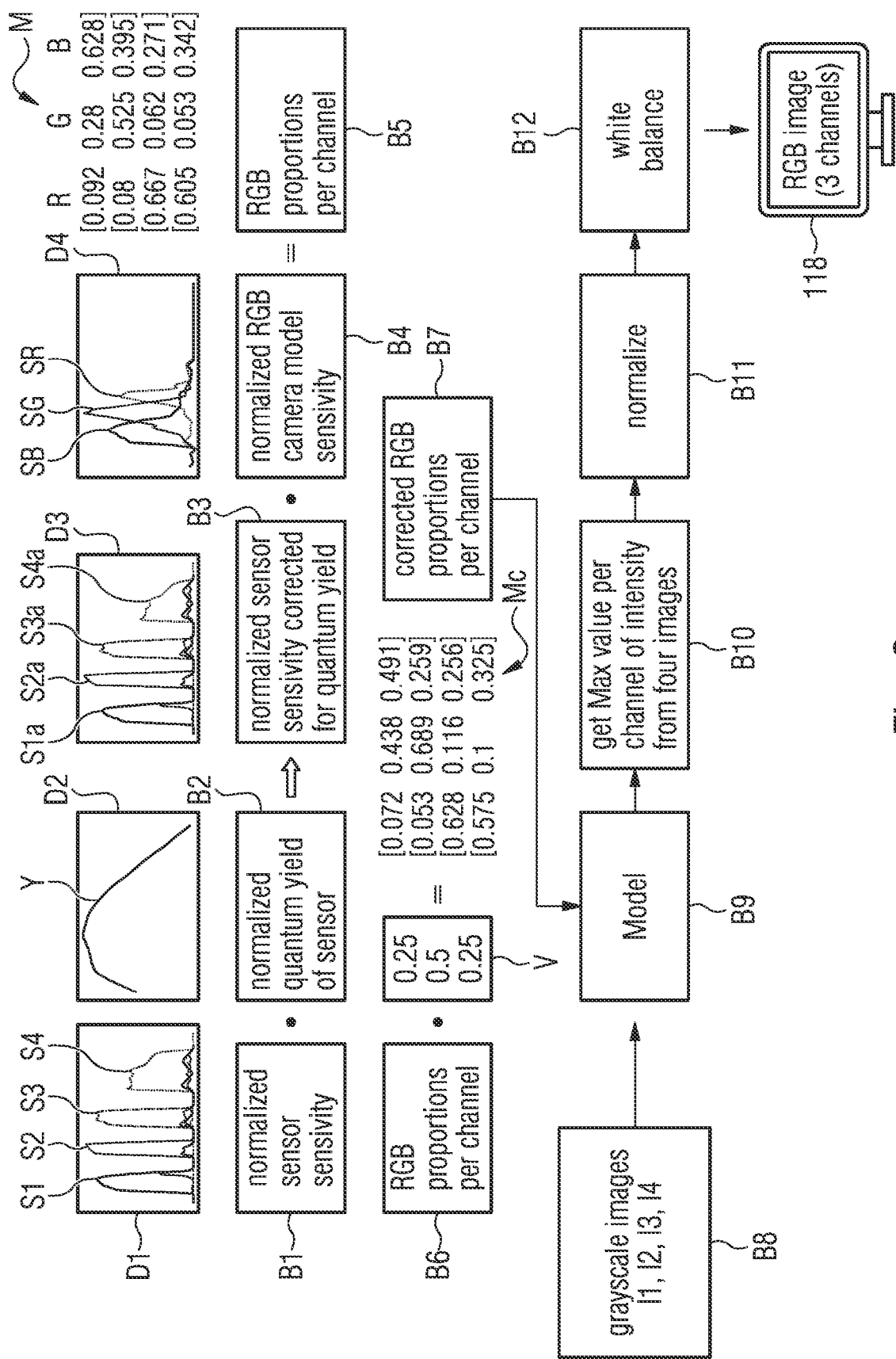
FIG. 2 is a schematic diagram illustrating a process executed by the digital imaging device for generating a digital color image.

FIG. 1 is a diagram showing a fluorescence microscope including a digital imaging device according to an embodiment; and FIG. 2 a diagram illustrating a process for synthesizing a digital color image executed by the digital imaging device shown in FIG. 1.

FIG. 1 is a block diagram showing a fluorescence microscope 100 which may comprise an object slide 102 on which an object 104 is located. The microscope 100 comprises a digital imaging device 106 which is configured to generate a number of digital grayscale images of the object 104 at a number of different spectral sensitivities. For this, the digital imaging device 106 may comprise a corresponding number of image sensors 108, 110, 112, and 114. Each image sensor 108 to 114 obtains a digital grayscale image referred to as I1, I2, I3, and I4 in FIG. 1. The image sensors 108 to 114 may be formed by CMOS sensors without being limited thereto. In order to acquire the grayscale images I1 to I4 in different spectra, suitable optical filters may be used, each of these optical filters transmitting fluorescent light emerging from the object 104 only in a specific wavelength region towards the image sensor.

The digital imaging device 106 further comprises a processor 116 which may be configured to control overall operation of the fluorescence microscope 100. Specifically, the processor 116 serves to control a color imaging process as explained below in further detail with reference to FIG. 2. For this, the processor 100 is coupled to the image sensors 108 to 114 for obtaining the digital grayscale images I1 to I4 which are to be processed for color imaging.

The imaging device 106 may further comprise a display device 118 and a memory 120 which are coupled to the processor 116 likewise.

Hereinafter, it may be assumed that the fluorescence microscope 100 is formed by a wide field-microscope so that each of the image sensors 108 to 114 obtains a wide-field image of the object 104. However, the fluorescence microscope 100 is not limited to a wide-field configuration. For instance, a confocal microscope configuration may be applied in which each image sensor 108 to 114 is formed by a point sensor, and each digital grayscale image I1 to I4 comprises a plurality of pixels which are sequentially obtained by the respective image sensor 108 to 114.

FIG. 2 is a diagram illustrating a process executed by the digital imaging device 106 for synthesizing a digital color image of the object 104 based on the digital grayscale images I1 to I4 which are obtained by the image sensors 108 to 114. In the following example, it is assumed that the digital color image is an RGB image which corresponds to a superposition of three color images for R, G, and B. Needless to say that the process illustrated in FIG. 2 may also be applied to another color space as for instance a CMYK color space.

First, the processor 116 obtains normalized data representing the different spectral sensitivities of the image sensors 108 to 114 as illustrated by block B1 and diagram D1. Specifically, the image sensor 108 may have a spectral sensitivity as indicated by curve S1 in diagram D1. Likewise, a spectral sensitivity of the image sensor 110 is indicated by curve S2, a spectral sensitivity of the image sensor 112 is indicated by curve S3, and a spectral sensitivity of the image sensor 114 is indicated by curve S4. As can be seen in diagram D1, the spectral wavelength regions corresponding the spectral sensitivities S1 to S4 are essentially separated from each other, i.e. do not overlap. According to the diagram D1 in FIG. 2, the spectral sensitivities S1, S2, S3, S4 may essentially correspond to blue, green, yellow, and red, respectively. As explained hereinafter, the spectral sensitivities S1 to S4 define four input channels which are to be transformed into the RGB space color space for simulating an RGB color camera.

Subsequently, as illustrated by block B2 and diagram D2 in FIG. 2, a normalized quantum yield Y of each image sensor 108 to 114 is obtained. The spectral sensitivities S1 to S4 of the image sensors 108 to 114 are multiplied by the quantum yield Y so that quantum yield corrected spectral sensitivities S1a, S2a, S3a, and S4a are obtained as illustrated by block B3 and diagram D3.

In a next step, normalized model sensitivities SB, SG, and SR of an RGB camera model are taken into account as illustrated by block B4 and diagram D4. Utilizing the RGB color space as a target color space, the model sensitivities SB, SG, and SR are typically determined in accordance with a Bayer filter. Specifically, the three spectral model sensitivities SB, SG, and SR define a target model onto which the spectral sensitivities S1, S2, S3, S4 of the image sensors 108 to 112 are to be mapped. In diagram D4, the model sensitivity SB corresponds to color B, the model sensitivity SG corresponds to color G, and the model sensitivity SR corresponds to color R. As a characteristic of the Bayer filter, the spectral model characteristic SG corresponding to G is overrated in relation to the model sensitivities SB and SR corresponding to B and R, respectively.

The mapping of the spectral sensitivities S1, S2, S3, S4 of diagram D1 onto the RGB target model defined by the model sensitivities SB, SG, SR of diagram D4 is implemented by weighting factors as illustrated by block B5 and matrix M in FIG. 2. Specifically, the matrix M includes three columns corresponding to the three output color channels R, G, B of the target system, and the matrix M includes four rows corresponding to the four spectral sensitivities S1, S2, S3, S4 of the image sensors 108 to 114. Accordingly, each column R, G and B of the matrix M includes four values corresponding to the four spectral sensitivities S1, S2, S3, and S4, respectively. Each of these values specifies a weighting factor that determines a proportion with which each spectral sensitivity S1, S2, S3, S4 is mapped onto the respective color channel R, G, and B. For instance, the first row of the matrix M indicates that the first spectral sensitivity S1 is mapped with a weighting factor 0.092 onto the color channel R, with a weighting factor 0.28 onto the color channel G, and with a weighting factor 0.628 onto the color channel B. Likewise, according to the second row of the matrix M, the spectral sensitivity S2 is mapped with a weighting factor 0.08 onto the color channel R, with a weighting factor 0.525 onto the color channel G, and with a weighting factor 0.395 onto the color channel B. According to the third row of the matrix M, the spectral sensitivity S3 is mapped with a weighting factor 0.667 onto the color channel R, with a weighting factor 0.062 onto the color channel G, and with a weighting factor 0.271 onto the color channel B. According to the fourth row of the matrix M, the spectral sensitivity S4 is mapped with a weighting factor 0.605 onto the color channel R, with a weighting factor 0.053 onto the color channel G, and with a weighting factor 0.342 onto the color channel B.

In this respect, it is to be noted that a symbol "*" between blocks B3 and B4 in FIG. 2 indicates a mapping function which is applied for transforming the four input channels represented by the spectral sensitivities S1, S2, S3 and S4 into the three output channels represented by the color channels R, G, and B. As both the input channel S1, S2, S3, S4 and the output channels R, G, B are known in advance, a suitable mapping function can be determined for implementing the mapping from the input channels to the output channels.

Subsequently, as illustrated by block B6, the matrix M obtained in block B5 is multiplied by a vector V which includes correction values 0.25, 0.5, and 0.25 determined in accordance with the Bayer filter. Thus, a corrected model matrix Mc is obtained including corrected weighting factors which may be stored in the memory 120 as illustrated by block B7.

Based on the model matrix Mc including the corrected weighting factors, color imaging can be performed in real time. For this, the grayscale images I1 to I4 are acquired by means of the image sensors 108 to 114 as illustrated by block B8. Subsequently, the model matrix Mc is retrieved from the memory 120, and the processor 116 distributes grayscale information included in each grayscale image I1 to I4 over the color channels R, G, and B in accordance with the weighting factors of the model matrix Mc as illustrated by block B9.

Specifically, according to the first row of Mc, the grayscale information of the first grayscale image I1 assigned to the spectral sensitivity S1 is mapped with a weighting factor 0.072 onto the color channel R, with a weighting factor 0.438 onto the color channel G, and with a weighting factor 0.491 onto the color channel B. Likewise, according to the second row of Mc, the grayscale information of the second grayscale image I2 assigned to the spectral sensitivity S2 is mapped with a weighting factor 0.053 onto the color channel R, with a weighting factor 0.689 onto the color channel G, and with a weighting factor 0.259 onto the color channel B. According to the third row of Mc, the grayscale information of the third grayscale image I3 assigned to the spectral sensitivity S3 is mapped with a weighting factor 0.628 onto the color channel R, with a weighting factor 0.116 onto the color channel G, and with a weighting factor 0.256 onto the color channel B. According to the fourth row of Mc, the grayscale information of the fourth grayscale image I4 assigned to the spectral sensitivity S4 is mapped with a weighting factor 0.575 onto the color channel R, with a weighting factor 0.100 onto the color channel G, and with a weighting factor 0.325 onto the color channel B. As a result, image values in color channels R, G, and B are obtained based on the grayscale information included in the grayscale images I1 to I4.

Then, as illustrated by block B10, the processor 116 may determine a maximum from all image values obtained in block B9. Further, the processor 116 may determine a scale factor and normalize the image values with the scale factor as illustrated by block B11. Subsequently, the processor 116 may perform white balance processing as illustrated by block B12. Finally, the resulting digital RGB color image is displayed on the display device 118.

It is to be noted that the model matrix Mc, which includes the weighting factors Mc, can be determined prior to the real-time color imaging which is based on the acquisition of the grayscale images I1 to I4. In particular, as the matrix Mc can be calculated independently of the grayscale images I1 to F4, the matrix Mc is to be determined only once and can be stored for further imaging.

Further, it is to be noted that the process explained above includes optional steps which may be omitted. For instance, normalizing the spectral sensitivities S1 to S4 based on the quantum yield Y as illustrated by block B2 may not be required depending on the specific image sensors used. Likewise, the Bayer matrix correction may be omitted in case that another model color space is applied.

As used herein the term "and/or" includes any and all combinations of one or more of the associated listed items and may be abbreviated as "/".

Although some features have been described in the context of an apparatus, it is clear that these features also represent a description of the corresponding method, where a block or device corresponds to a method step or a feature of a method step. Analogously, features described in the context of a method step also represent a description of a corresponding block or item or feature of a corresponding apparatus.

Some embodiments relate to a microscope comprising a system as described in connection with one or more of the FIGS. 1 to 2. Alternatively, a microscope may be part of or connected to a system as described in connection with one or more of the FIGS. 1 to 2. FIG. 3 shows a schematic illustration of a system 300 configured to perform a method described herein. The system 300 comprises a microscope 310 and a computer system 320. The microscope 310 is configured to take images and is connected to the computer system 320. The computer system 320 is configured to execute at least a part of a method described herein. The computer system 320 may be configured to execute a machine learning algorithm. The computer system 320 and microscope 310 may be separate entities but can also be integrated together in one common housing. The computer system 320 may be part of a central processing system of the microscope 310 and/or the computer system 320 may be part of a subcomponent of the microscope 310, such as a sensor, an actor, a camera or an illumination unit, etc. of the microscope 310.

The computer system 320 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 320 may comprise any circuit or combination of circuits. In one embodiment, the computer system 320 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 320 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 320 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 320 may also include a display device, one or more speakers, and a keyboard and/or controller, which can include a mouse, trackball, touch screen, voice-recognition device, or any other device that permits a system user to input information into and receive information from the computer system 320.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 fluorescence microscope
102 imaging unit
104 object
106 digital imaging device
108-114 image sensor
116 processor
118 display device
120 memory
300 system
310 microscope
320 computer system
S1-S4 spectral sensitivities
S1a-S4a corrected spectral sensitivities
Y sensor quantum yield
SB, SG, SR model sensitivities
B1-B12 blocks
D1-D4 diagrams
M, Mc matrix
V vector

What is claimed is:

1. A microscope comprising:
a digital imaging device, the digital imaging device comprising:
a processor; and
a tangible, non-transitory computer-readable medium having instructions thereon which, upon being executed by the processor, facilitate:
obtaining a plurality of digital grayscale images of an object at a plurality of different spectral sensitivities, each of the plurality of digital grayscale images includes grayscale information based on a different one of the plurality of different spectral sensitivities,
obtaining a plurality of weighting factors for each of the digital grayscale images, wherein the plurality of weighting factors are represented by a matrix indicating associations between the plurality of different spectral sensitivities and a plurality of color channels defining a predetermined color space, and
synthesizing a digital color image of the object from the digital grayscale images in the color space by distributing the grayscale information of each grayscale image over the plurality of color channels in accordance with the matrix.

2. The microscope according to claim 1, wherein a number of the plurality of different spectral sensitivities of the grayscale images is different from a number of the plurality of color channels of the color space.

3. The microscope according to claim 1, wherein a number of rows of the matrix is equal to a number of the plurality of different spectral sensitivities and a number of columns of the matrix is equal to a number of the plurality of color channels of the color space.

4. The microscope according to claim 1, wherein the grayscale information of each digital grayscale image is corrected for a sensor quantum yield.

5. The microscope according to claim 1, wherein the plurality of weighting factors are corrected in accordance with a Bayer filter.

6. The microscope according to claim 1, wherein the instructions which, upon being executed by the processor, further facilitate: determining a maximum from all image values of the digital color image, and normalizing the image values based on the maximum.

7. The microscope according to claim 1, wherein the instructions which, upon being executed by the processor, further facilitate: performing a white balance on the digital color image.

8. The microscope according to claim 1, further comprising a plurality of image sensors configured to acquire the plurality of digital grayscale images at the plurality of different spectral sensitivities, wherein each of the plurality of image sensors is associated with a spectral sensitivity of the plurality of different spectral sensitivities.

9. The microscope according to claim 8, wherein each of the plurality of image sensors is formed by a wide-field sensor.

10. The microscope according to claim 1, further comprising a display device configured to display the digital color image in real time.

11. The microscope according to claim 1, wherein the color space is a red, green, blue (RGB) color space.

12. A method for generating a digital color image of an object, the method comprising:

obtaining, using a microscope, a plurality of digital grayscale images of the object at a plurality of different spectral sensitivities, each of the plurality of digital grayscale images includes grayscale information based on a different one of the plurality of different spectral sensitivities, obtaining a plurality of weighting factors for each of the digital grayscale images, wherein the plurality of weighting factors are represented by a matrix indicating associations between the plurality of different spectral sensitivities and a plurality of color channels defining a predetermined color space, and synthesizing a digital color image of the object from the digital grayscale images in the color space by distributing the grayscale information of each grayscale image over the plurality of color channels in accordance with the matrix.

13. The method according to claim 12, wherein the plurality of weighting factors are obtained by reading the plurality of weighting factors from a memory.

14. A tangible, non-transitory computer-readable medium having instructions thereon which, upon execution by one or more processors, provides for execution of the method according to claim 12.

* * * * *